(12) United States Patent
Dobson et al.

(10) Patent No.: US 7,236,510 B2
(45) Date of Patent: *Jun. 26, 2007

(54) EQUALIZER WITH DECISION FEEDBACK FREQUENCY TRACKING AND BIT DECODING FOR SPREAD SPECTRUM COMMUNICATIONS

(75) Inventors: W. Kurt Dobson, Sandy, UT (US); Dirk Ostermiller, Holladay, UT (US); Sy Prestwich, Riverton, UT (US); Scott Bevan, Lehi, UT (US)

(73) Assignee: S5 Wireless, Inc., Draper, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 519 days.

This patent is subject to a terminal disclaimer.

(21) Appl. No.: 10/676,798

(22) Filed: Oct. 1, 2003

(65) Prior Publication Data

US 2005/0100081 A1    May 12, 2005

(51) Int. Cl.
*H04B 1/69* (2006.01)

(52) U.S. Cl. ..................................... 375/130

(58) Field of Classification Search .............. 375/130, 375/141, 135, 136, 143, 146, 147, 152, 142, 375/343; 370/320, 335, 441, 342
See application file for complete search history.

(56) References Cited

U.S. PATENT DOCUMENTS

| | | | |
|---|---|---|---|
| 4,670,885 A | 6/1987 | Parl et al. ...................... 375/1 |
| 4,761,796 A | 8/1988 | Dunn et al. .................... 375/1 |
| 5,136,612 A * | 8/1992 | Bi .............................. 370/342 |
| 5,168,508 A | 12/1992 | Iwasaki et al. ................ 375/1 |
| 5,233,626 A | 8/1993 | Ames ............................ 375/1 |
| 5,239,556 A | 8/1993 | Ishigaki et al. ................ 375/1 |
| 5,546,424 A * | 8/1996 | Miyake ....................... 375/141 |
| 5,596,601 A | 1/1997 | Bar-David .................. 375/207 |
| 5,623,511 A | 4/1997 | Bar David et al. ......... 375/207 |
| 5,712,869 A | 1/1998 | Lee et al. |
| 5,748,677 A | 5/1998 | Kumar ....................... 375/285 |
| 5,825,807 A | 10/1998 | Kumar ....................... 375/200 |
| 5,936,997 A | 8/1999 | Kanda ........................ 375/200 |
| 6,035,008 A | 3/2000 | Kim ........................... 375/345 |
| 6,047,019 A | 4/2000 | Ishii ........................... 375/206 |
| 6,128,329 A | 10/2000 | Takakusaki ................. 375/140 |
| 6,141,393 A | 10/2000 | Thomas et al. ............. 375/347 |
| 6,175,588 B1 | 1/2001 | Visotsky et al. ............ 375/148 |

(Continued)

*Primary Examiner*—Emmanuel Bayard
(74) *Attorney, Agent, or Firm*—Madson & Austin (57) ABSTRACT

A spread spectrum communications system adapted to receive simultaneous signals from multiple transmitters, separates frequency error and equalizes and decodes continuous streams of data sets from a plurality of matched filters with frequency correction and which sorts through data and successfully decodes data bits. The spread spectrum communications system includes a transmitter and a receiver. The receiver includes an RF receiver. At least one PNB matched filter receives signals from the RF receiver. A plurality of frequency shifters receives a signal from the at least one PNB matched filter. A plurality of PNA matched filters receives data from the at least one PNB matched filter and the plurality of frequency shifters. An equalizer/decoder receives signals from the plurality of PNA matched filters.

11 Claims, 9 Drawing Sheets

U.S. PATENT DOCUMENTS

| | | | |
|---|---|---|---|
| 6,215,762 B1 | 4/2001 | Dent | 370/208 |
| 6,310,907 B1 | 10/2001 | Tsujimoto | 375/141 |
| 6,473,447 B1 | 10/2002 | Strich et al. | 375/130 |
| 6,522,683 B1 | 2/2003 | Smee et al. | 375/144 |
| 6,556,617 B1 | 4/2003 | Tsujimoto | 375/141 |
| RE38,603 E * | 9/2004 | Kim et al. | 375/141 |
| 6,885,691 B1 * | 4/2005 | Lyu | 375/130 |
| 6,934,245 B2 * | 8/2005 | Kwak et al. | 370/204 |
| 2005/0074054 A1 | 4/2005 | Dobson et al. | |

* cited by examiner

EQUALIZER WITH DECISION FEEDBACK FREQUENCY TRACKING AND BIT DECODING FOR SPREAD SPECTRUM COMMUNICATIONS

BACKGROUND OF INVENTION

1. Field of the Invention

This invention relates to spread spectrum communications systems. More specifically, this invention relates to equalizers with frequency tracking and bit decoding algorithm for spread spectrum communications systems.

2. Description of Related Art

A variety of spread spectrum communication system devices and techniques are well known in the art. Typically, in prior systems, significant problems are encountered in spread spectrum receivers where signals from simultaneous transmitters, each with frequency error, must be separated, equalized and decoded.

Although the following cited U.S. patent documents are not necessarily "prior art," the reader is referred to the following U.S. patent documents for general background material. Each of these patents is hereby incorporated by references in its entirety for the material contained therein.

U.S. Pat. Nos. 4,670,885; 4,761,796; 5,168,508; 5,233,626; 5,239,556; 5,596,601; 5,623,511; 5,748,677; 5,825,807; 5,936,997; 6,035,008; 6,047,019; 6,128,329; 6,141,393; 6,175,588; 6,215,762; 6,310,907; 6,473,447; 6,522,683; and 6,556,617.

SUMMARY OF INVENTION

It is desirable to provide an equalizer and decoder for use in a spread spectrum communication system. Moreover, it desirable to provide an equalizer and decoder for use in a spread spectrum communication system that is capable of handling a continuous stream of data sets from a bank of matched filters with frequency correction.

Accordingly, it is an object of this invention to provide an equalizer and decoder for use in a spread spectrum communication system that is capable of handling signals from simultaneous transmitters.

Another object of this invention is to provide an equalizer and decoder for use in a spread spectrum communication system that can separate frequency error associated with transmitters.

A further object of this invention is to provide an equalizer and decoder for use in a spread spectrum communication system that can equalize frequency error associated with transmitters.

A still further object of this invention is to provide an equalizer and decoder for use in a spread spectrum communication system that can equalize amplitude error associated with transmitters.

A still further object of this invention is to provide an equalizer and decoder for use in a spread spectrum communication system that can decode signals from a spread spectrum transmitter.

Additional objects, advantages, and other novel features of this invention will be set forth in part in the description that follows and in part will become apparent to those of ordinary skill in the art upon examination of the following, or may be learned with the practice of the invention as described herein. The objects and advantages of this invention may be realized and attained by means of the instrumentalities and combinations particularly pointed out in the appended claims. Still other objects of the present invention will become readily apparent to those skilled in the art from the following description wherein there is shown and described the preferred embodiment of the invention, simply by way of illustration of one of the modes best suited to carry out this invention. As it will be realized, this invention is capable of other different embodiments, and its several details and specific circuits are capable of modification in various aspects without departing from the invention. Accordingly, the objects, drawings and descriptions should be regarded as illustrative in nature and not as restrictive.

BRIEF DESCRIPTION OF DRAWINGS

The accompanying drawings incorporated in and forming a part of the specification, illustrate present preferred embodiments of the invention. Some, although not all alternative embodiments are described in the following description. In the drawings.

Reference will now be made in detail to the present embodiments of the invention, examples of which are illustrated in the accompanying drawings.

DETAILED DESCRIPTION

This invention is spread spectrum communication system that includes an equalizer with decision feedback frequency tracking and bit decoding along with an improved pseudo noise ("PN") code sequencing and matched filter architecture to provide a spread spectrum communication system that is designed to be able to handle a continuous stream of data sets from a bank of matched filters with frequency correction to sort through all the data and successfully decode bits. Processing gain in spread spectrum communications systems can be used to increase the communication channel ("Link") distance and the signal-to-noise ("SNR") margins. Processing gain is itself directly related to the length of the PN code employed. For example, a PN code length of 1000 yields a processing gain of 30 dB, while a PN code length of 10,000 yields a processing gain of 40 dB. In the present invention, long, scalable PN sequences are used with a low-complexity matched filter architecture to provide variable communication rates, robust recovery of multiple devices in ordinary as well as long distance, high interference operating environments. In the present invention sites may receive signals, simultaneously or near simultaneously, from a multitude of transmitting devices. Each of these received signals will typically have a corresponding frequency error. These system requirements tend to preclude locking the receiver to an individual transmitting "client" device in order to achieve frequency coherence across long PN sequences. This invention addresses this problem with a receiver architecture designed so as to facilitate the "simultaneous" receipt of signals, with a wide range of data rates, from a variety of devices.

Figure 1:
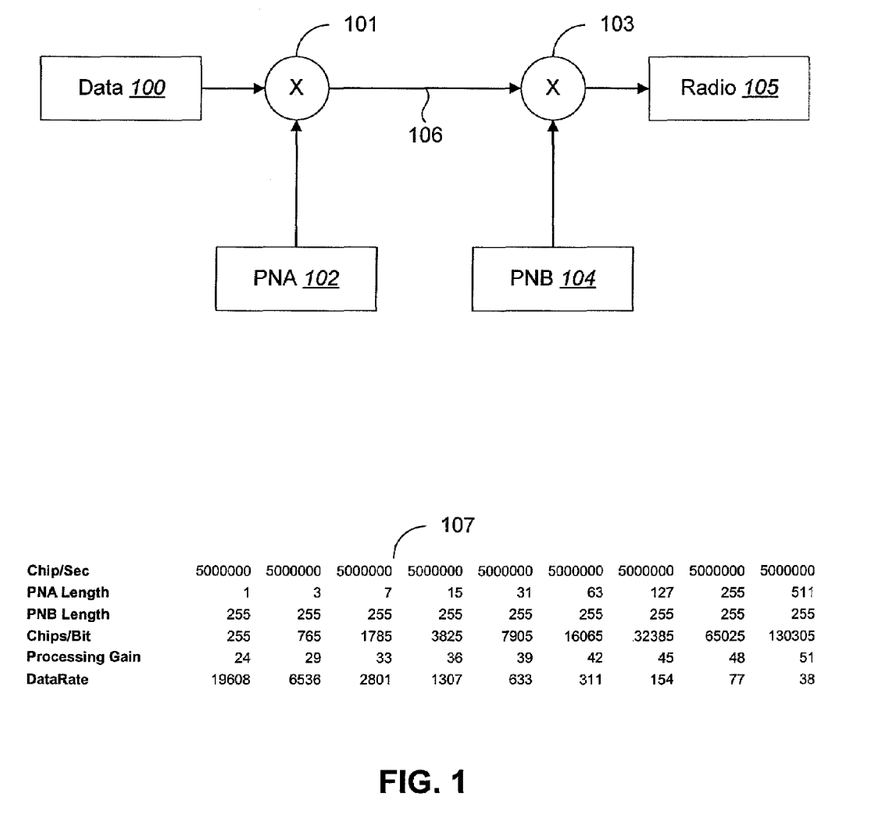
FIG. 1 is a system block diagram showing the major components of one preferred embodiment of the invention.

Referring now to FIG. 1 shows a system block diagram showing the major components of one preferred embodiment of the invention. Data bits 100 are spread 101 by a variable length PNA code 102. Typically, this spread 101 operates to spread the data 100 from 1 to 511 chips, although in alternative embodiments the spread may be varied without departing from the concept of this invention. The resulting chips 106 are further spread 103 by a fixed length PNB code 104. In the present preferred embodiment of the invention, a chipping rate of 5 MCPS is used, further scaling the data rates from 19.608 kbps to 38 bits/second, providing processing gains of from 24 dB to 51 dB, respectively, depending on the application requirements and the available signal-to-noise ratio in the available link (communication channel). The resulting spread data is transmitted, typically using a radio transmitter 105 for use with an RF link. Table 107 shows the performance of a variety of PNA code lengths. As can be seen, with a constant chip rate, here 5 MCPS, as the PNA code length is increased from 1 to 511, the chips per bit increase from 255 to 130305, the processing gain increases from 24 dB to 51 dB and the data rate is reduced from 19608 to 38 bps. Typically, the length of the fixed length PNB code is designed to be short enough to ensure that the worst case frequency error plus the Doppler shift will cause no more than 180 degrees of phase roll, or a correlation loss in the first matched filter of approximately 4 dB.

Figure 2:
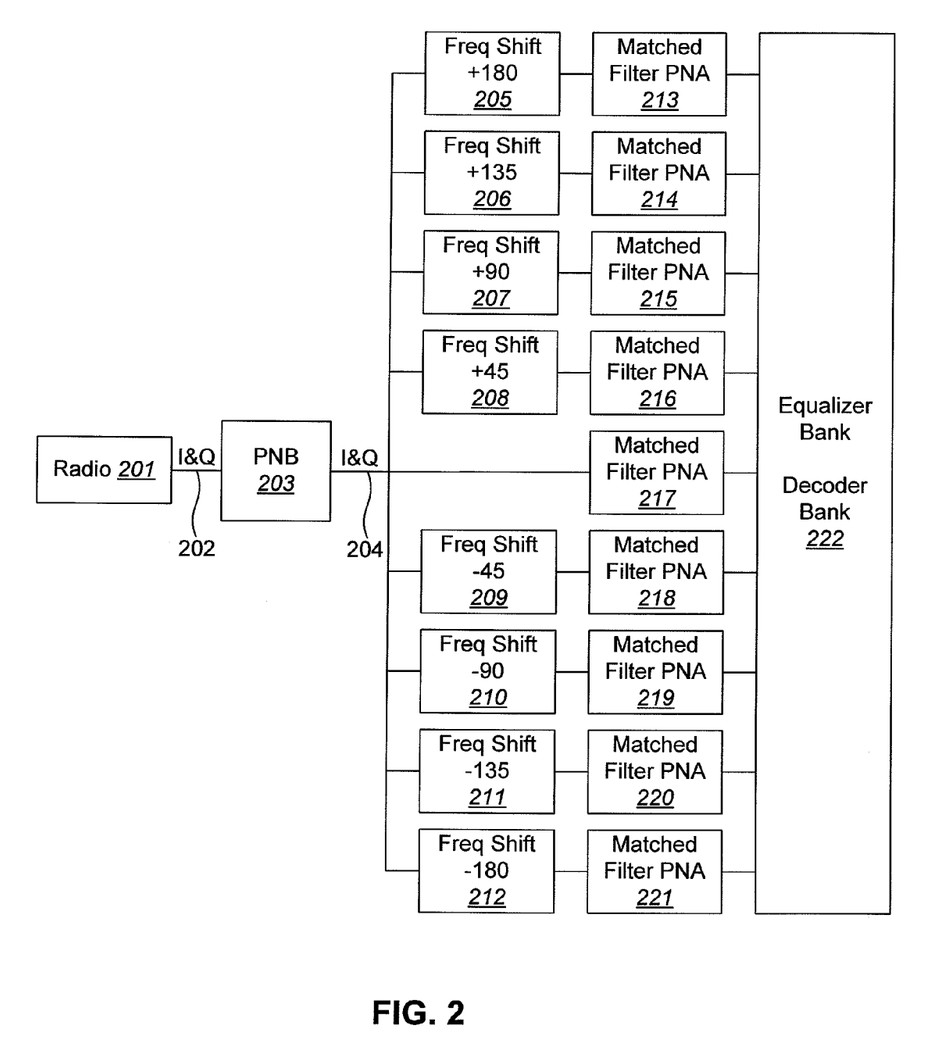
FIG. 2 is a detailed block diagram of the matched filter architecture of one preferred embodiment of this invention.

FIG. 2 shows a detailed block diagram of the matched filter architecture of one preferred embodiment of the method of this invention. The receiver portion of the present data link of this invention includes a radio receiver 201. The output 202 of the receiver 201 provides I & Q channels, which are processed by a matched filter PNB 203 and then by a set of frequency shifters 205, 206, 207, 208, 209, 210, 211, 212. In the present embodiment of the invention, the frequency shifters 205, 206, 207, 208, 209, 210, 211, 212 are arranged forty-five degrees apart. With this architecture the total structure consists of a center frequency (no discernable error) and plus/minus forty-five degree corrections, which in total cover the worst-case frequency error. Because the frequency can be rolling as much as 180 degrees across a single PNB code length, the bank of frequency shifters 205, 206, 207, 208, 209, 210, 211, 212 are used prior to sending the data 204 through the PNA matched filters 213, 214, 215, 216, 217, 218, 219, 220, 221. Although, in this FIG. 2 eight frequency shifters and nine PNA and one PNB matched filters are shown, the number of each actually employed in a particular embodiment of the invention is dependent on the worst-case frequency roll across the PNB filter. In the present example, approximately 1.3 ppm requires a total of nine banks, including the center frequency filter plus and minus four filters either side of the center frequency. If the total system ppm frequency error is 2.6 ppm, a total of seventeen PNA filters (center bank plus eight frequency shifters on each side) are required. The frequency shifters 205, 206, 207, 208, 209, 210, 211, 212 perform a complex frequency shift. The PNA matched filters 213, 214, 215, 216, 217, 218, 219, 220, 221 receive data from the frequency shifters 205, 206, 207, 208, 209, 210, 211, 212 and PNB filter 203 and provide a filtered output signals to the equalizer decoder bank 222. The PNB matched filters 203 of the present example of the invention is length 511. While the data output from the first matched filter 203 may still have significant frequency error, the output data from the optimum PNA filter should be within forty-five degrees where the optimum filter is defined as the one with the smallest error. The other filter outputs are typically discardable. But, since there is no practical way to determine which filter is the most correct, data from all filter banks 213, 214, 215, 216, 217, 218, 219, 220, 221 are processed by the equalizer/decoder banks 222 to determine the optimum filter output. In alternative embodiments, the PNA matched filters can be set to other lengths for scalable bit rates. The outputs of the bank of matched filters (PNA) 213, 214, 215, 216, 217, 218, 219, 220, 221 are received by the equalizer/decoder banks 222. The equalizer/decoder banks 222 examines the outputs of each matched filter 213, 214, 215, 216, 217, 218, 219, 220, 221 and determines the frequency shift of the received signal and appropriately selects the set of most advantageous signals.

Figure 3:
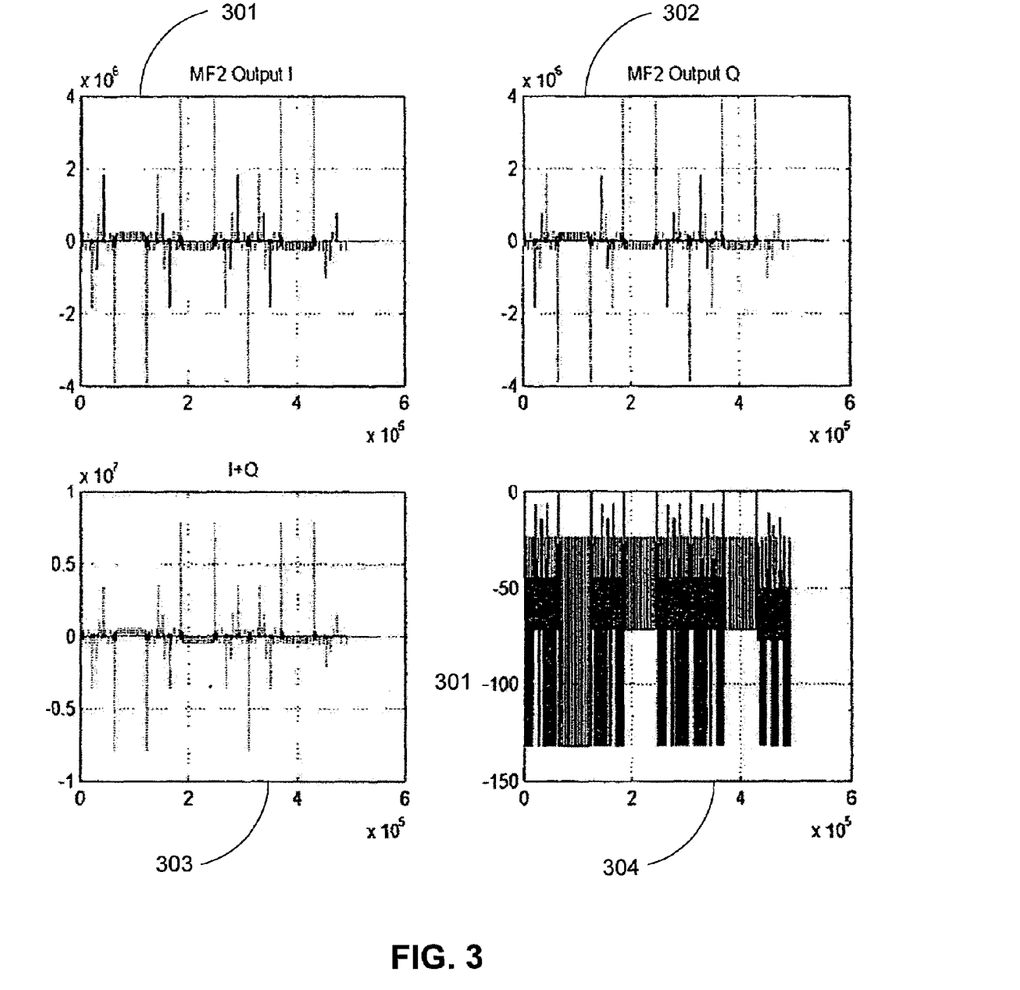
FIG. 3 is a set of plots of the IQ signal data.

FIG. 3 shows a set of plots of the IQ signal data. Signals arriving at the equalizer/decoder banks 222 may have originated from multiple transmitters, both near and far, each with frequency errors and unknown bit timing. Furthermore, the I&Q data coming out of the PNA filters 213, 214, 215, 216, 217, 218, 219, 220, 221 will, in the present example of the invention, typically remain at a sample rate of 40 MSPS and, in alternative embodiments, can be even higher where closer triangulation accuracy is required. FIGS. 301, 302 shows the I&Q signals respectively coming out of the matched filter bank (PNA) 213, 214, 215, 216, 217, 218, 219, 220, 221. The sum of I and Q is shown in FIG. 303. The magnitude plot, normalized to 0 dB and plotted as 20*log 10 in FIG. 304. In these plots 301, 302, 303, 304 the data shown represent an ideal case with no frequency error.

Figure 4:
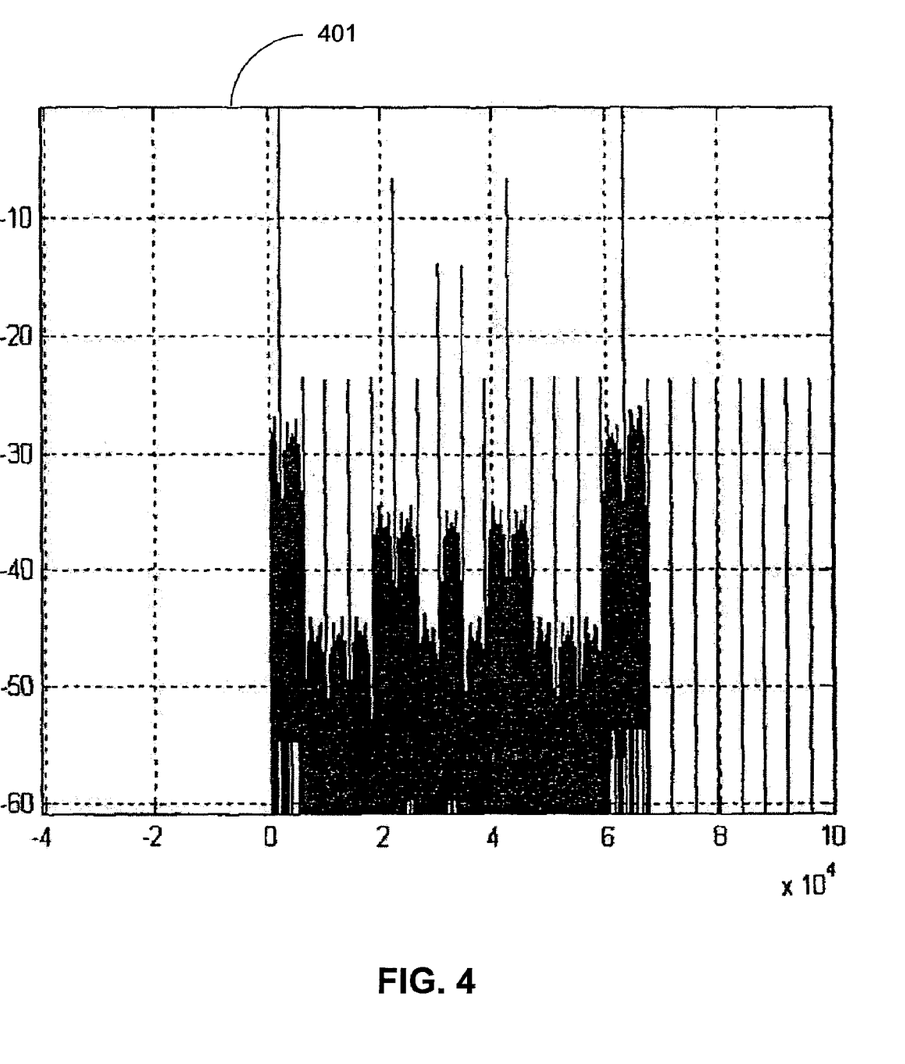
FIG. 4 is a plot of the PN B matched filter output with no frequency error.
Figure 5:
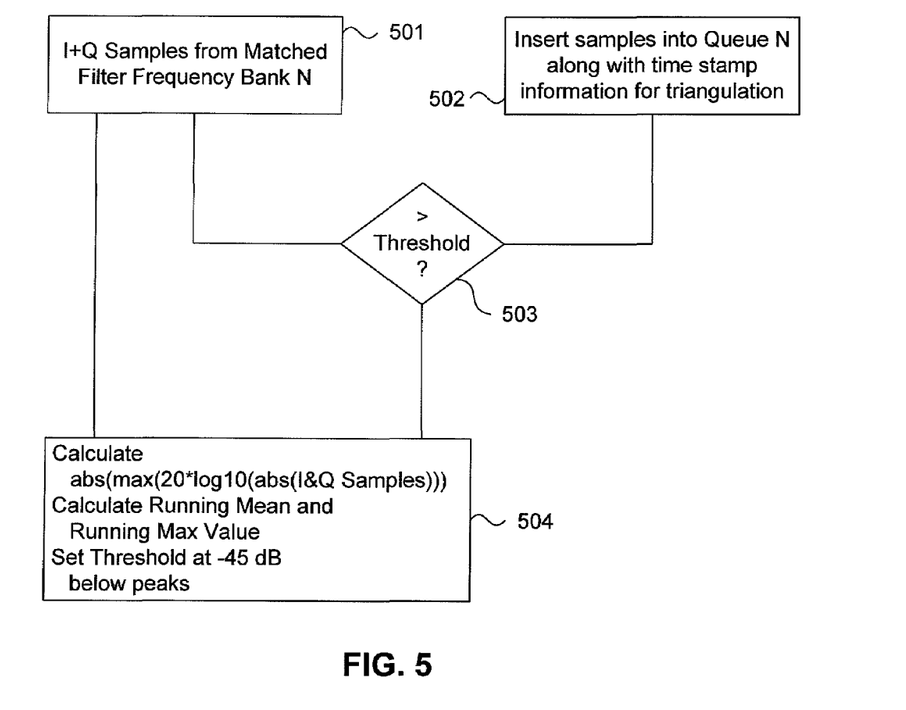
FIG. 5 is a process flow diagram of the basic operations in forming an equalizer block in the method of this invention.

FIG. 4 shows a plot 401 of the PN B matched filter output with no frequency error. This plot 401 is a close-up view of the time domain output of the magnitude of a typical PNA matched filter bank 213, 214, 215, 216, 217, 218, 219, 220, 221, with no frequency error shown for clarity. The peaks shown about 0 dB are the correlations at the data rate and occur every 15 PNB lengths, in the present example of the invention. The correlation peaks from approximately −5 to −23 dB are partial correlation products that are due to the use of the concatenated codes. In the present example of the invention, these occur at every PNB chip. The remaining correlations shown from approximately −30 dB, −35 dB and −45 dB and are the cross-correlation products due to the use of binary phase shift keying ("BPSK") modulation of the PN sequences. Because, in the present example of the embodiment of the invention, high chipping and sample rates are used, the matched filters are preferably implemented in hardware. The present preferred embodiment of invention implements the equalizer and decoder in high-speed DSP chips, although in alternative embodiments, a full hardware, full software, firmware and/or combination of hardware, software and firmware could be used to implement the equalizer and decoder functions, depending on economic conditions and advances in electronics technology. In the present DSP implementation, every sample is not necessarily processed, so long as correlations that are likely to represent bits are processed. In the present example, a PNA of length 15 and a PNB of length 511 are used. A threshold setting of −45 dB below the maximum correlation peaks ensures the reception of distant transmitters and results in processing about 25% of the samples. Therefore, the equalizer block 222 is set to a threshold such that 25% of the samples are forwarded to the decoder block 222. FIG. 5 shows the basic operations of the present equalizer 222.

FIG. 5 shows a process flow diagram of the basic operations in forming an equalizer block in the method of this invention. The magnitude of I+Q sample pairs from a single PNA matched filter N are determined 501. If 503, this number is greater than the desired threshold, then the samples are inserted 502 into a queue N along with a time stamp for triangulation. The desired threshold is set by calculating 504 the absolute maximum value of 20*log 10 (abs (I & Q Samples)) and the running mean and running maximum value is calculated. The desired threshold is set to ensure the reception of distant transmitters and minimize the number of false triggers. In the present example embodiment, the threshold is set at −45 dB below the peaks and nine input queues are used, where either hardware or a DSP running software tasks can process the samples in the input queues. The queues presently contain periodic time-stamp information such that location based services are provided, in the preferred embodiment, following a successful decode of a message.

A device, in the present embodiment, sends a packet consisting of a preamble, packet length, device ID, data and CRC, and may include additional data or fields. Knowing the preamble sequence, length and CRC, permits the use of the process further detailed in FIG. 6 below.

Figure 6:
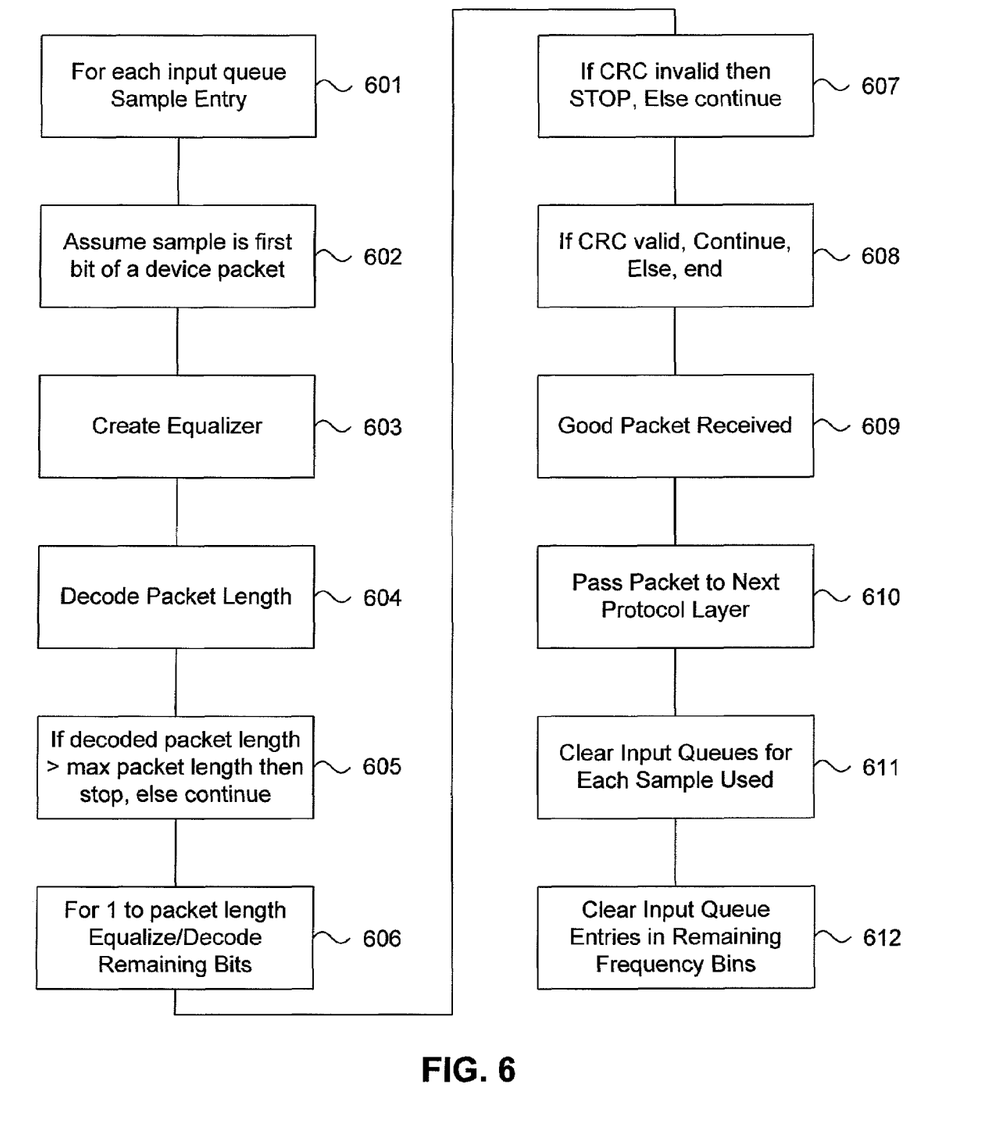
FIG. 6 is a process flow diagram of the packet decode process of the present method of this invention.

FIG. 6 shows a process flow diagram of the packet decode process of the present method of this invention. For each input queue sample entry 601 the following steps are performed. Assume 602 that this sample is the first bit of a device packet. Create 603 an equalizer using the a-priori known preamble sequence and assume that this equalizer is good. The equalizer is used to decode 604 the packet length. If 605 the decoded packet length is greater than the maximum packet length then stop, otherwise continue. For 1 to packet length equalize/decode 606 the remaining bits. If 607 the CRC is invalid then stop. Otherwise, if 608 the CRC is valid continue. A good packet is received 609. The good packet is passed 610 to the next protocol layer. Input queues are cleared 611 for each sample used. The input queue entries in the remaining frequency bins are cleared 612. This process results in the production of either a known good packet, because of the CRC check, or it will fail. Because the samples in other frequency bins are identical other than the frequency correction, their queue entries are deleted by the first successful packet decode, thereby avoiding extra computations.

Figure 7:
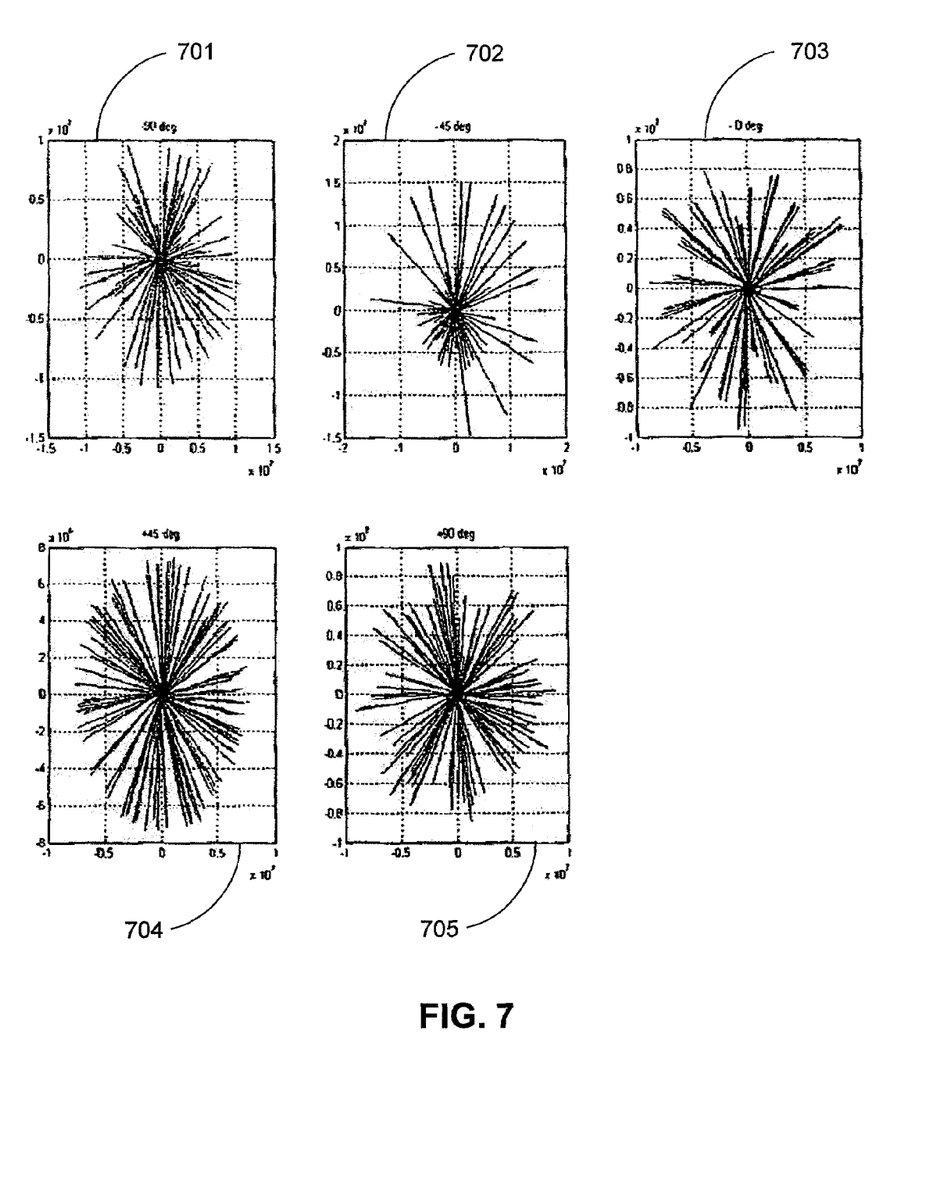
FIG. 7 is a set of complex plots of the outputs of the matched filter banks of the present embodiment of this invention.

FIG. 7 shows a set of complex plots of the outputs of the matched filter banks of the present embodiment of this invention. The equalization and decoding of bits is presently performed with a signal having a frequency error of −60 degrees per PNB sequence. The FIGS. 701, 702, 703, 704, 705 are complex plots of the outputs of the matched filter banks from −90 degrees to +90 degrees. FIG. 701 is a plot of the output at −90 degrees. FIG. 702 is a plot of the output at −45 degrees. FIG. 703 is a plot of the output at 0 degrees. FIG. 704 is a plot of the output at +45 degrees. FIG. 705 is a plot of the output at +90 degrees. It can be seen that the output of the −45 degree matched filter, for the example data, is the closest, and it will be used to explain the equalizer/decoder method, since for this example, it is the only one which will result in a successful packet decode. However, as noted above, in the present and alternative embodiments, each output may be processed by the equalizer/decoder. In the case of a single transmitting device, the closest match is the one with the largest peak-to-mean average. In practice with near/far transmitters, it may not always be possible to predict the best bin to start with. In the present example, the PNA sequence is within 15 degrees of being correct after the frequency correction operation (60−45=15). Significant frequency roll remains through the PNB sequence.

Figure 8:
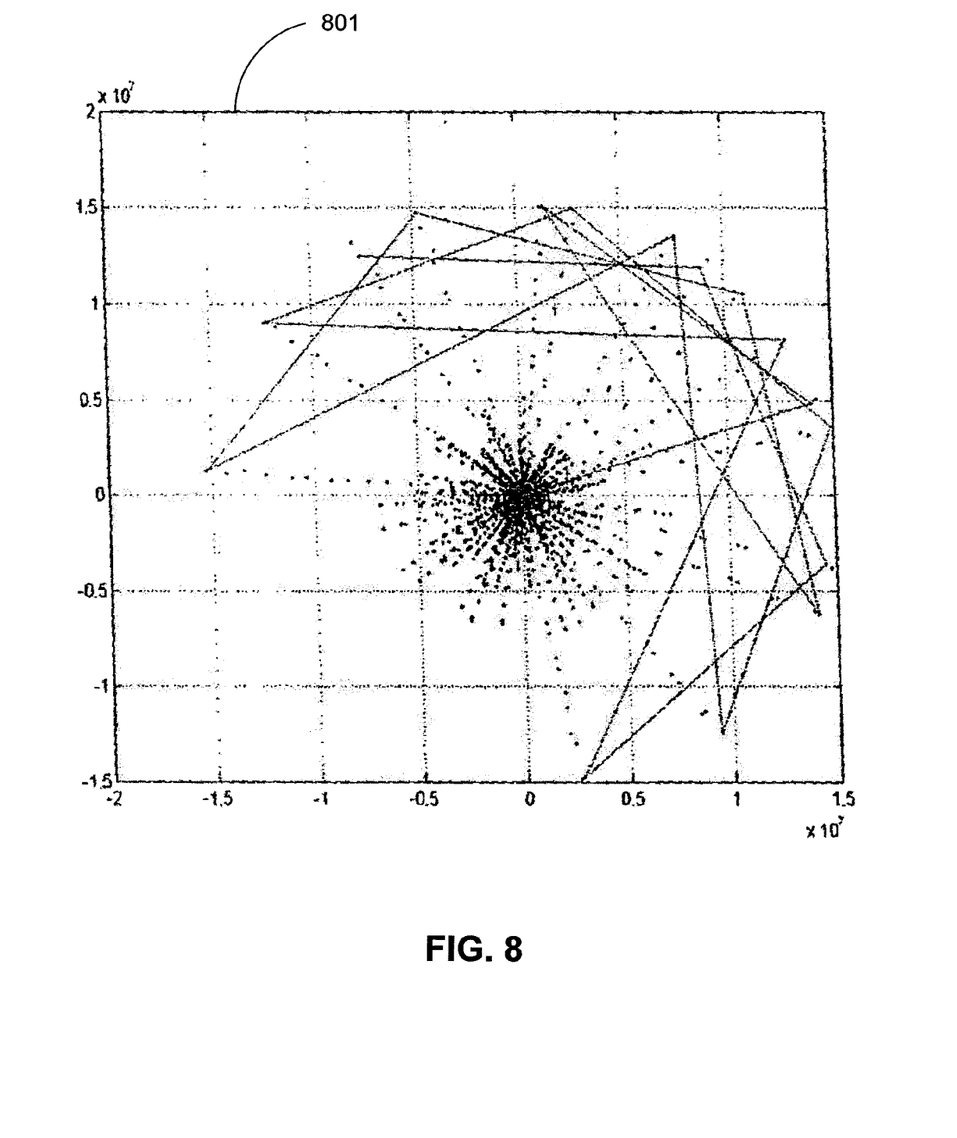
FIG. 8 is a sequence plot of the 16-bits after the second matched filter of the present embodiment of this invention.

FIG. 8 shows a sequence plot 801 of the 16-bits after the PNA matched filter of the present embodiment of this invention. Starting at the first peak (assuming it is the correct starting point) the bits are plotted in sequence to illustrate the frequency roll. The equalizer is created for the first bit. It is assumed that it is the first bit of the preamble and it is assumed that the first bit is a digital "one", in which case the actual position after equalization is 1+1i. The first equalization ("EQ") position is described in complex vector form as:

CorrPoint=1+i

EQ=data(1)/EQ

Eqdata=data(1 . . . k)/EQ where the CorrPoint is the known complex position for a bit equal to one, where the EQ is the complex equalizer formed by a division of the actual first data point (data(1)) and where EQdata is the resulting equalized data set of the first k points.

The result is a complex vector containing a data set that has been scaled relative to 1+1i and has been rotated so that the first point sits at forty-five degrees (1+1i), the correct position of a BPSK modulated "one" bit. The remaining bits are still rotating due to remaining frequency error. The next step is to make an estimate of the frequency roll per bit. This step is accomplished by taking the equalized data points for the length of the preamble and calculating the angles, the delta angles of the preamble and taking a mean value. The result is a (noisy) estimate of the phase roll through the preamble.

Pream_angle=angle(EQdata(1 . . . k))*180/πangle=arctan (y/x)

delta_angles=Pream_$_{angle}$(k)−Pream_angle(k+1)

ang_$_{est}$=mean(delta_angles)

where Pream_angle is the resulting angles, k is the length of preamble, angle is computed as arctan(y/x), delta_angles are the differences from point to point and where ang_est is the resulting mean value of the deltas.

Once the estimate of the phase roll per bit, decoding bits begins. The present process for decoding is as follows:

(1) The equalizer update rate is set, presently alpha is set to 0.1 and outbits is set to 0.

(2) The angle of the first sample is set to 45 degrees.

(3) The first bit of a preamble is presently always set to "one" and the error of the first bit is set to "zero".

(4) The initial angle is set for the second sample, presently the angles(k) are set according to angles(k)=mod((angle (EQdata(k))*180/pi)+((k−1)*ang_est), 360).

(5) The current x-y coordinates of the compensation angle are set, presently y=sin(angle_upd*pi/180) and x=cos (angle_upd*pi/180).

(6) The complex equalizer value is set Eqxy=x+i*y.

(7) The error is subtracted, presently if k>1, EQxy=((1−alpha)*EQxy)+(alpha*error(k−1)).

(8) The current vector value is multiplied by EQ rotation, presently outEQdata(k)=(EQdata(k)*EQxy).

(9) The resulting angle is calculated, presently theta=angle(outEQdata(k))*180/pi.

(10) The decision boundary is computed, presently, if theta>−45 and theta<135, then outbits(k)=1.

(11) The error vector is computed for 1, presently error(k)=(−1+1i)−outEQdata(k).

(12) The error vector for 0 is computed, presently error(k)=(1+1i)−outEQdata(k).

(13) The rolling EQ rotation is updated, presently, angle_upd=angle_upd+ang_est.

The equalization process begins with decision feedback update rate (alpha) and an empty output vector is initialized. A "FOR" loop runs from the send bit to the length of the packet. The angle_upd parameter is used for form a complex EQxy point, which is then multiplied against the data using the alpha factor plus the error term. The complex equalize point is then used to multiply against the next input point to scale and rotate it into position. The decoder forms a decision boundary to decode the bits, and the output bit is generated along with an error vector normalized to the origin. The angle_upd parameter is then updated for the next bit.

Figure 9:
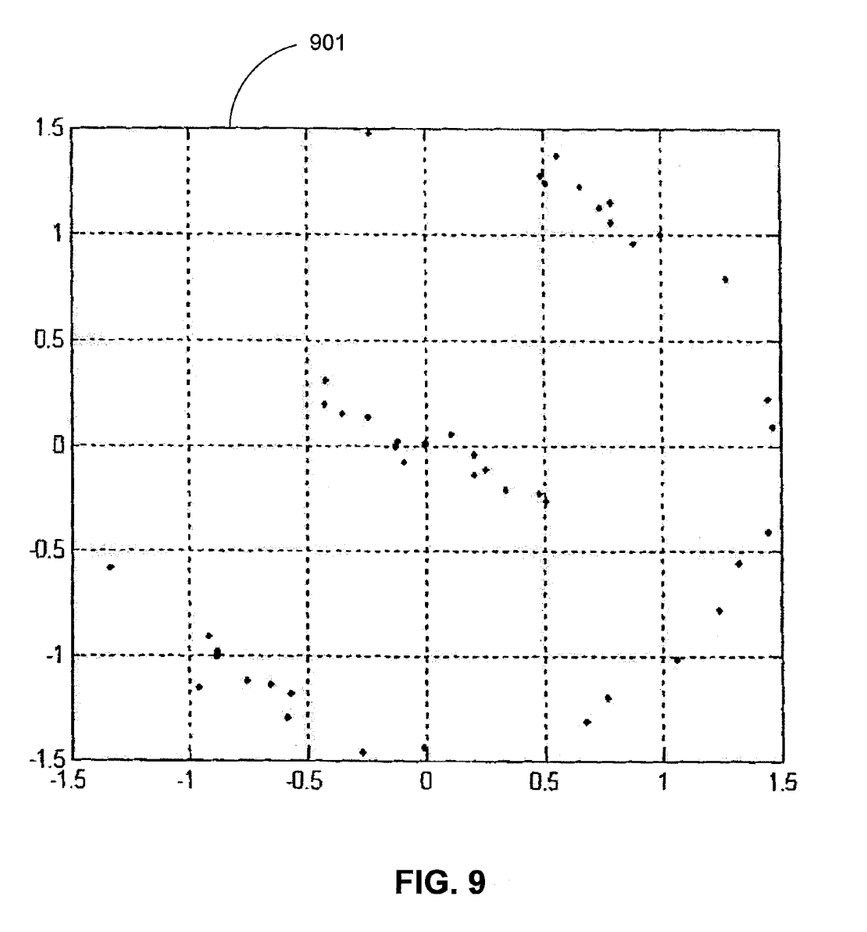
FIG. 9 is a plot of the results of the equalizing and decoding of the present embodiment of this invention.

FIG. 9 shows a plot 901 of the results of the equalizing and decoding of the present embodiment of this invention. The original bits are shown rolling in frequency. The computed error vector points per bit are shown along with the bits. As can be seen in this plot 901, the equalization/decoding process has removed the error and frequency roll. The described present embodiment of this invention corrects frequency error, while alternative embodiments, for example, can include a full complex equalizer.

The described embodiment of this invention is to be considered in all respects only as illustrative and not as restrictive. Although specific steps and associated formulas are provided, the invention is not limited thereto. The scope of this invention is, therefore, indicated by the claims rather than by the foregoing description. All changes, which come within the meaning and range of equivalency of the claims, are to be embraced within their scope.

The invention claimed is:

1. A spread spectrum communications system, comprising:
 (A) a transmitter, said transmitter further comprising:
  (1) a data source;
  (2) a first mixer spreading data from said data source with a first pseudo noise source (PNA);
  (3) a second mixer spreading data from said first mixer with a second pseudo noise source (PNB);
  (4) an RF transmitter;
 (B) a receiver, said receiver further comprising:
  (1) an RF receiver;
  (2) at least one PNB matched filter receiving signals from said RF receiver;
  (3) a plurality of frequency shifters, receiving a signal from said at least one PNB matched filter;
  (4) a plurality of PNA matched filters receiving data from said at least one PNB matched filter and said plurality of frequency shifters; and
  (5) an equalizer/decoder receiving signals from said plurality of PNA matched filters.

2. A spread spectrum communications system, as recited in claim 1, wherein said PNA pseudo noise source provides a variable length code sequence.

3. A spread spectrum communications system, as recited in claim 1, wherein said PNB pseudo noise source provides a fixed length code sequence.

4. A spread spectrum communications system, as recited in claim 1, wherein said first mixer/multiplier spreads said data from said data source with a variable PN code PNA.

5. A spread spectrum communications system, as recited in claim 1, wherein said second mixer/multiplier spreads said data from said first mixer with a fixed length PN code PNB.

6. A spread spectrum communications system, as recited in claim 1, wherein said PNB matched filter further comprises a set of coefficients correlated to said PNB pseudo noise source.

7. A spread spectrum communications system, as recited in claim 1, wherein said plurality of frequency shifters are offset from each other by one or more degrees.

8. A spread spectrum communications system, as recited in claim 1, wherein said PNA matched filters are correlated to said PNA pseudo noise source.

9. A spread spectrum communications system, as recited in claim 1, wherein said PNB matched filters are correlated to said PNB pseudo noise source.

10. A spread spectrum communications system, as recited in claim 1, wherein said equalizer/decoder selects an advantageous signal from said received signals from said plurality of PNA matched filters.

11. A spread spectrum communications system, as recited in claim 1, wherein said equalizer/decoder performs the steps consisting of:
 (A) initializing an update magnitude;
 (B) forming a complex equalization point;
 (C) scaling and rotating said equalization point into position;
 (D) forming a decision boundary to decode bits;
 (E) generating an output bit along with an error vector normalized to the origin; and
 (F) updating angle and magnitude parameters for the next bit.

* * * * *